United States Patent
Toutonghi

(10) Patent No.: US 7,950,065 B2
(45) Date of Patent: May 24, 2011

(54) METHOD AND SYSTEM TO CONTROL ACCESS TO CONTENT STORED ON A WEB SERVER

(75) Inventor: Michael J Toutonghi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 11/558,908

(22) Filed: Nov. 11, 2006

(65) Prior Publication Data

US 2008/0115227 A1    May 15, 2008

(51) Int. Cl.
*G06F 17/30* (2006.01)
*H04L 29/06* (2006.01)

(52) U.S. Cl. .............................. 726/29; 726/10; 713/168
(58) Field of Classification Search ................ 726/2–21, 726/29; 713/168
See application file for complete search history.

(56) References Cited

U.S. PATENT DOCUMENTS

| | | | |
|---|---|---|---|
| 6,360,254 B1 * | 3/2002 | Linden et al. ................. | 709/219 |
| 7,502,760 B1 * | 3/2009 | Gupta ............................. | 705/66 |
| 7,743,404 B1 * | 6/2010 | Deutschmann et al. .......... | 726/2 |
| 2006/0015742 A1 * | 1/2006 | Camaisa et al. .............. | 713/182 |
| 2007/0055731 A1 * | 3/2007 | Thibeault ...................... | 709/204 |

\* cited by examiner

*Primary Examiner* — Kambiz Zand
*Assistant Examiner* — Michael Guirguis
(74) *Attorney, Agent, or Firm* — Workman Nydegger

(57) ABSTRACT

Embodiments of the invention describe a technique to Content may be viewed or accessed with a link. The access or viewing of the content may be controlled by using an encrypted link that is generated and sent to an authorized user. When the authorized user uses a client system to access the content with the link, the client system is registered and the link is associated with the client system. When the link is forwarded to another computer system and the link is received from the other computer system in an attempt the access the content associated with the link, access to the content is at least initially, denied.

17 Claims, 5 Drawing Sheets

METHOD AND SYSTEM TO CONTROL ACCESS TO CONTENT STORED ON A WEB SERVER

FIELD

A method and system to control access to content stored on a web server.

BACKGROUND

Content stored on web servers may be freely shared by generating a link to the content and distributing the link to users who wish to access the content. For example, a user may have an online web album and may wish to share a particular photograph from the online web album with a few of his friends. To do this, the web server generates a link to the particular photograph which the user then shares with his friends by distributing the link to his friends.

In one case, it is possible for a friend who receives the link to in turn distribute the link to other people who may then view the photograph without any restriction.

This case is undesirable, as the user wishing to share content with others may wish to restrict or control access to the content.

SUMMARY

Embodiments of the invention describe a technique to control access to content that may be viewed or accessed with a link. Broadly, in accordance with one embodiment of the invention, an encrypted link to content is generated and sent to an authorized user. When the authorized user uses a client system (CS) to access the content with the link, the client system is registered and the link is associated with the client system. When the link is forwarded to another computer system and the link is received from the other computer system in an attempt the access the content associated with the link, access to the content is, at least initially, denied. In some embodiments a user of the other computer system may be required to pass an authentication challenge, and access to the content is allowed if the user is authenticated as the authorized user. Users that are not authorized may be invited to request a new or fresh link. A new or fresh link may be issued to an unauthenticated user in which case the unauthenticated user becomes an authorized user. Receipt of the fresh link from client computer results in registration of the client system as described above. For an authenticated user who is attempting to access the content from an unregistered computer, a registration operation is performed to register the unregistered computer. For added security, in some embodiments, a link may automatically expire after some user defined period, say fifteen days after its creation.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the invention describe a technique to control access to content that may be viewed or accessed with a link. Broadly, in accordance with one embodiment of the invention, an encrypted link to content is generated and sent to an authorized user. When the authorized user uses a client system (CS) to access the content with the link, the client system is registered and the link is associated with the client system. When the link is forwarded to another computer system and the link is received from the other computer system in an attempt the access the content associated with the link, access to the content is, at least initially, denied. In some embodiments a user of the other computer system may be required to pass an authentication challenge, and access to the content is allowed if the user is authenticated as the authorized user. Users that are not authorized may be invited to request a new or fresh link. A new or fresh link may be issued to an unauthenticated user in which case the unauthenticated user becomes an authorized user. Receipt of the fresh link from client computer results in registration of the client system as described above. For an authenticated user who is attempting to access the content from an unregistered computer, a registration operation is performed to register the unregistered computer. For added security, in some embodiments, a link may automatically expire after some user-defined period, say fifteen days after its creation.

Figure 1:
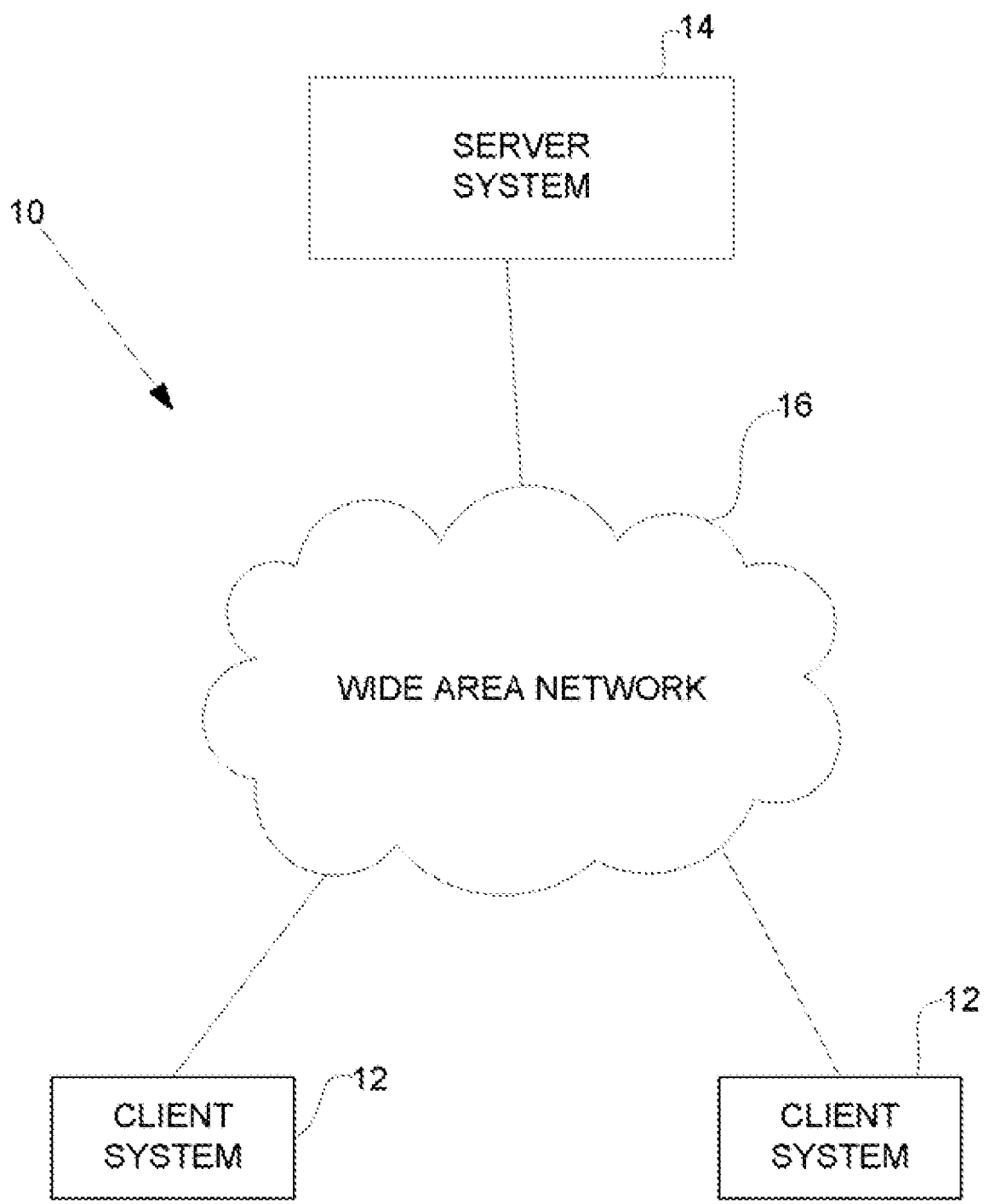
FIG. 1 shows a network architecture including a client system which is communicatively coupled to a server system, in accordance with one embodiment of the invention, via a wide area network.

Turning now to the drawings, FIG. 1 shows the architecture of a network 10 which includes a plurality of client systems 12 (only two of which are shown) connected to a server system 14 via an intermediate wide area network (WAN) 16. In one embodiment, the wide area network 16 may include the internet, and communications between the client systems 12 and the server system 14 may be in accordance with the Hypertext Transfer Protocol (HTTP), or the secure Hypertext Transfer Protocol (sHTTP) over the Transmission Control Protocol/Internet Protocol (TCP/IP).

Figure 2:
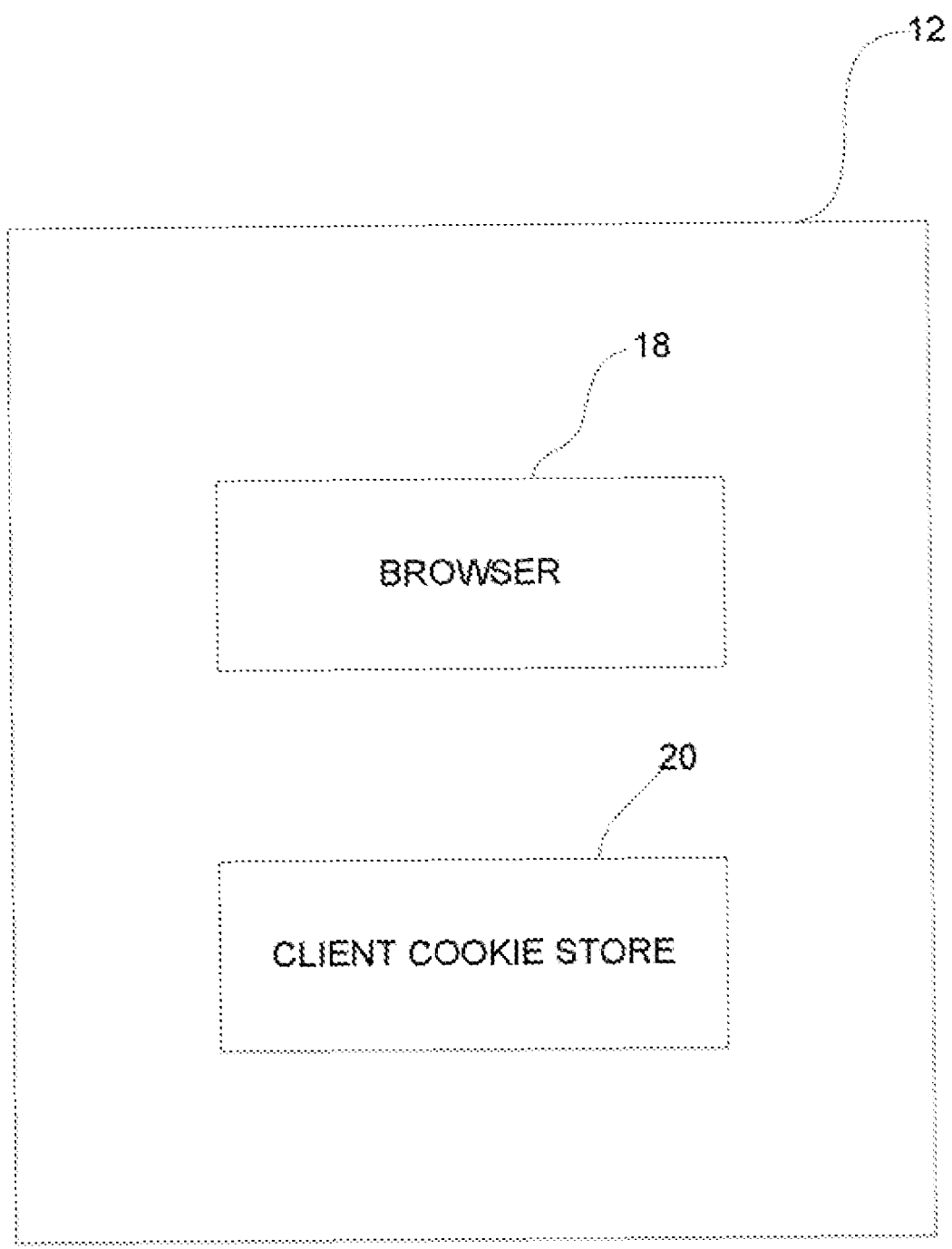
FIG. 2 shows a representation of the client system of FIG. 1, in accordance with one embodiment of the invention.

FIG. 2 of the drawing shows a representation of the client system 12, in accordance with one embodiment of the invention. In this representation, the client system 12 includes a browser 18 and a client cookie store 20. The client system 12 may represent any client computing device including a desktop personal computer (PC), a notebook or laptop PC, a handheld device such as a personal digital assistant (PDA), a mobile telephone, or a pocket PC.

Figure 3:
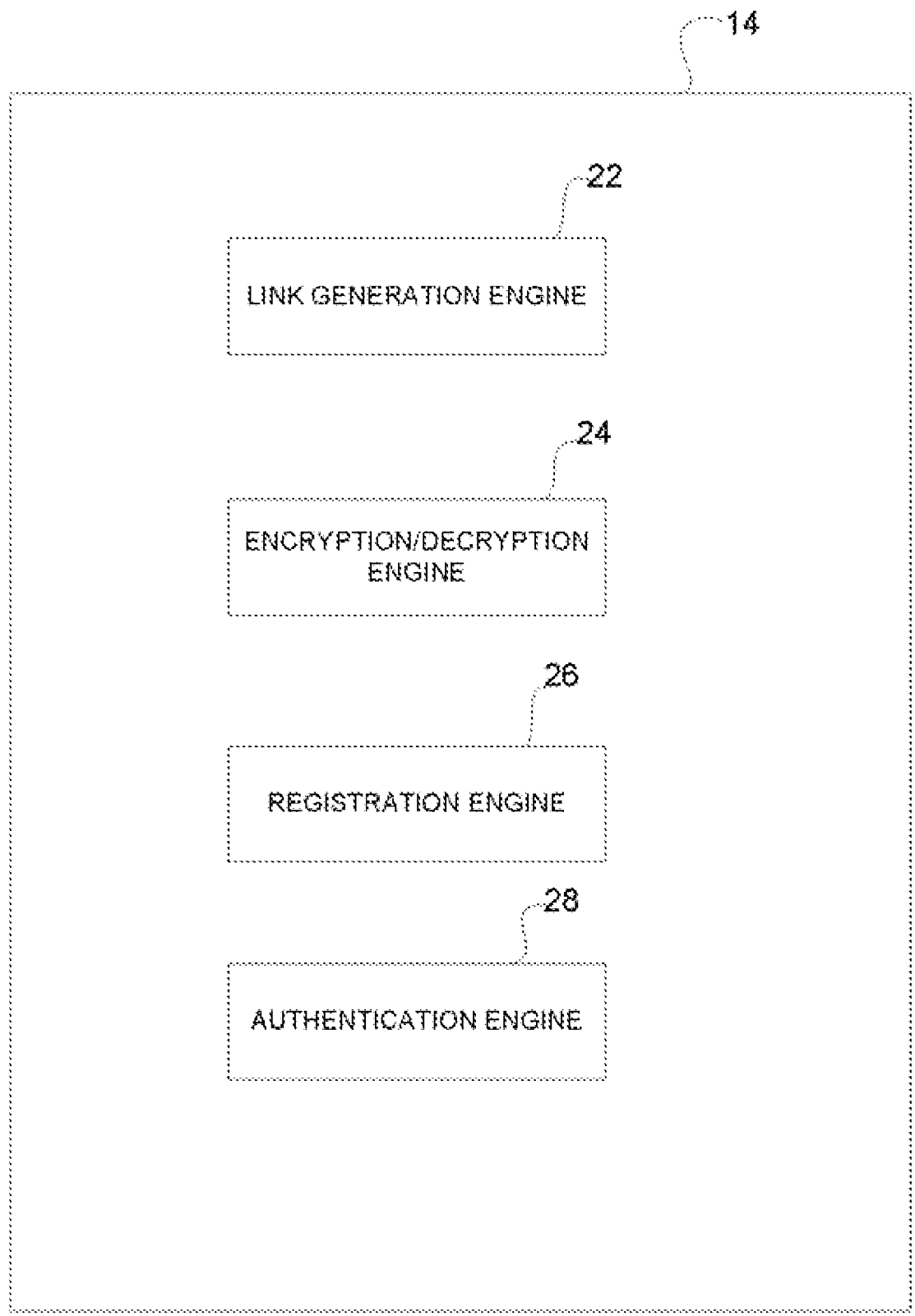
FIG. 3 shows a representation of the server system of FIG. 1A in accordance with one embodiment of the invention.

FIG. 3 of the drawing shows a representation of the server system 14, in accordance with one embodiment of the invention. In this representation, the server system 14 includes a link generation engine 22, a link encryption/decryption engine 24, a registration engine 26, and an authentication engine 28. The particular functions of each of the components of the server system 14 will become apparent from the description below.

Figure 4:
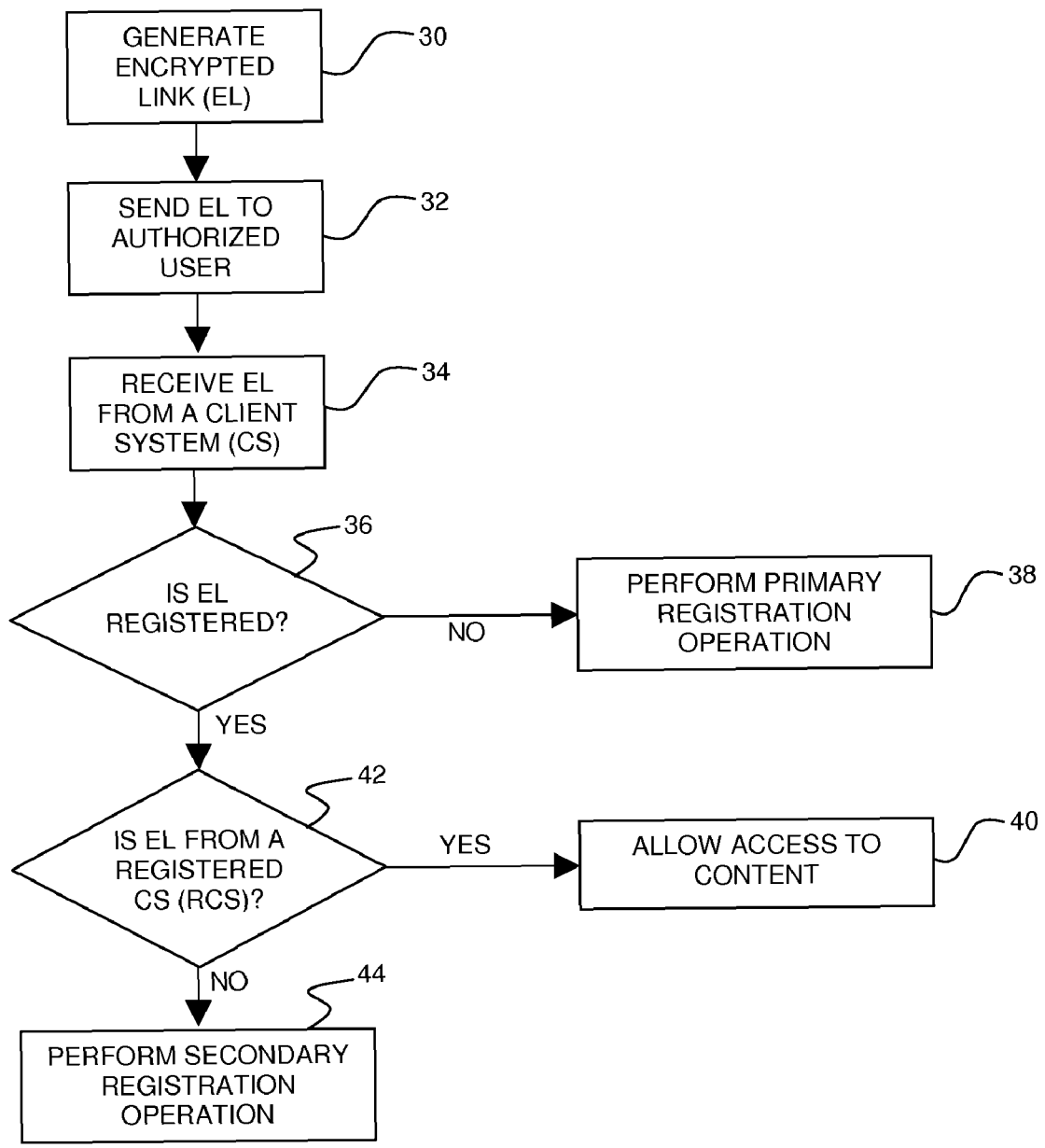
FIG. 4 shows a flowchart of operations performed by the server system of FIG. 1, in accordance with one embodiment of the invention.

Referring now to FIG. 4 of the drawings, there is shown a flowchart of operations performed by the server system 14 to control access to protected content, in accordance with one embodiment of the invention. The term "protected content" is intended to broadly cover all forms of electronic content such as documents, images, audio files, etc., access to which is to be controlled so that only authorized users may gain access thereto. As will be seen from FIG. 4, at block 30, the link generation engine 22 generates a link to the protected content. The link may include identifying information for the authorized user, for example the authorized user's email address and some password or key. The link generated by the link generation engine 22 is encrypted by the link encryption/decryption engine 24, which also stores a key to facilitate decryption of the encrypted link when it is received from a client system (CS).

At block 32, the encrypted link is sent to the authorized user, for example to the email address of the authorized user. When the link is received by the authorized user, the authorized user will typically activate the link by "clicking" on the link. This causes the web browser 18 of a client system 12 of the authorized user to transmit the link to the server system 14. Thus, at block 34, the server system 14 receives the encrypted link from a client system 12.

At block 36 the registration engine 24 determines if the encrypted link has been previously registered. If the encrypted link has not been previously registered, then at block 38 the registration engine 26 performs a primary registration operation. In one embodiment, the primary registration operation may include creating a registration record/database entry to indicate that the encrypted link has been activated and is associated or registered to the client system 12 from which the link was received, thus making such client system 12 a registered client system (RCS). Part of the primary registration operation performed at block 38, includes generating an encrypted packet or "cookie", which is transmitted to the registered client system (RCS) for storage thereon in the client cookie store 20, when the authorized user activates the encrypted link at a later time using the registered computer system (RCS), the encrypted cookie is also transmitted to the server system 14, to facilitate automatic authentication of the registered client system (RCS).

Once the operations at block 38 are completed, control flows to block 40 where access to protected content to which the link points is allowed. If at block 36, it is determined that the encrypted link has been registered then at block 42 the authentication engine 28 determines if the encrypted link has been received from a registered computer system (RCS), in which case access to the content is allowed at block 40. If however, at block 42, it is determined that the encrypted link is not received from a registered computer system (RCS) then control flows to block 44, where the registration engine 26 performs a secondary registration operation. In one embodiment, the secondary registration operation includes an operation to authenticate a user of the computer system as the authorized user to which the encrypted link generated at block 30 was initially sent. The authentication operation may include prompting the user to submit authentication information such as a user name and password, which can be verified against a stored username and password for the authorized user. If it turns out that the user is an authorized user attempting to use the link from an unregistered computer system, then part of the secondary registration operation includes making a database entry to record the unregistered computer system as a registered computer system (RCS), and generating an encrypted cookie which is transmitted to the registered computer system (RCS). As before, the purpose of the cookie is to facilitate authentication of a computer system from which an encrypted link is received, thereby to allow access to the content in future when the computer system is used to transmit the link to the server system 14. In the case of the user being unauthorized, which could be as a result of the user having been the recipient of a forwarded encrypted link from the authorized user, as part of the secondary registration operation at block 44, the unauthorized user may be invited or prompted to request a fresh or new link to the content. If the unauthorized user requests a fresh link, then the server 14 may automatically generate a new encrypted link and transmit same to the unauthorized user, alternatively, the system 14 may contact the owner of the protected content, and indicate to the owner that an unauthorized person is attempting to access the content, in which case the owner may grant or deny permission to access the content. If permission is denied, then the unauthorized user is notified accordingly. Alternatively, if permission is granted, then a new encrypted link is generated and transmitted to the unauthorized user. The unauthorized user then becomes an authorized user and can then register the link in the manner described above.

In one embodiment all links generated by the server 14 expire automatically, after a predefined period, say 15 days. The predefined period may be defined by the owner of the protected content. This embodiment is advantageous in that expired or dead links may be purged from the server system 14, thereby conserving valuable server space.

It will be appreciated, that one advantage of the techniques described above, is that access to content is controlled through the convenient mechanism of a link. At the same time, viewing of protected content of the user links are restricted to authorized users only, without having to bother authorized users to perform a registration operation to view restricted content as authentication information pertaining to the authorized user is embedded in the encrypted link.

Figure 5:
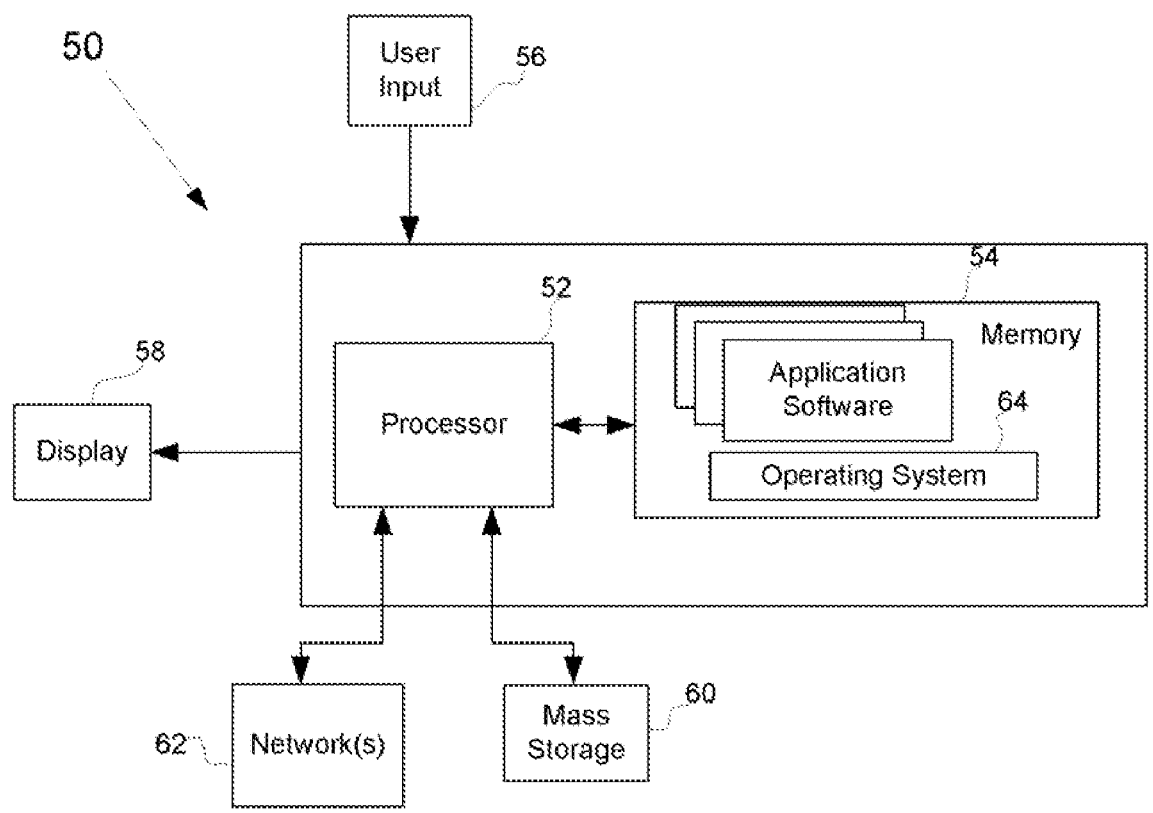
FIG. 5 shows a high level block diagram of hardware that may be used to implement any of the server, and client systems of FIG. 1.

Referring to FIG. 5 of the drawings, reference numeral 50 generally indicates hardware that may be used to implement any of the systems 12, or 14 in accordance with one embodiment. The hardware 50 typically includes at least one processor 52 coupled to a memory 54. The processor 52 may represent one or more processors (e.g., microprocessors), and the memory 124 may represent random access memory (RAM) devices comprising a main storage of the hardware 50, as well as any supplemental levels of memory e.g., cache memories, non-volatile or back-up memories (e.g. programmable or flash memories), read-only memories, etc. In addition, the memory 54 may be considered to include memory storage physically located elsewhere in the hardware 50, e.g. any cache memory in the processor 52, as well as any storage capacity used as a virtual memory, e.g., as stored on a mass storage device 60.

The hardware 50 also typically receives a number of inputs and outputs for communicating information externally. For interface with a user or operator, the hardware 50 may include one or more user input devices 56 (e.g., a keyboard, a mouse, etc.) and a display 58 (e.g., a Cathode Ray Tube (CRT) monitor, a Liquid Crystal Display (LCD) panel).

For additional storage, the hardware 50 may also include one or more mass storage devices 60, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 50 may include an interface with one or more networks 62 (e.g. a local area network (LAN), a wide area network (WAN), a wireless network, and/or the Internet among others) to permit the communication of information with other computers coupled to the networks. It should be appreciated that the hardware 50 typically includes suitable analog and/or digital interfaces between the processor 52 and each of the components 54, 56, 58 and 62 as is well known in the art.

The hardware 50 operates under the control of an operating system 64, and executes various computer software applications, components, programs, objects, modules, etc. (e.g. a program or module which performs operations described above) to perform other operations described with reference to FIGS. 1 through 4. Moreover, various applications, components, programs, objects, etc. may also execute on one or more processors in another computer coupled to the hardware 50 via a network 62, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as computer programs. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for protecting stored content on a web server such that the stored content is available through a link but only to a first device accessing the link, and so as to prevent access to subsequent devices who receive the link, the method comprising:

generating an encrypted link to content, the encrypted link comprising authentication information for an authorized user, and the content being accessible through a plurality of different encrypted links, each different encrypted link being registered to and reusable by a particular computing device;

sending the encrypted link to the authorized user;

receiving a request for the content, the request being the result of receipt of the encrypted link from a computing device;

using registration information to determine whether access to the content through the encrypted link should be granted, wherein using the registration information determining whether the requesting computing device itself registered to access the content through the encrypted link, as well as determining whether the computing device was the first computing device to request access to the content through the encrypted link;

when the computing device is determined to be the first computing device to request access to the content through the encrypted link, providing the content to the computing device, such that the encrypted link is reusable by the computing device; and when the computing device is determined not to be the first computing device to request access to the content through the encrypted link, denying access to the content.

2. The method of claim 1, further comprising performing a primary registration operation to register a client system to use the encrypted link.

3. The method of claim 2, wherein the primary registration operation comprises upon receiving the encrypted link from a client computing device, and if the encrypted link is received for the first time from any client computing device, then creating a registration record to indicate that the encrypted link is registered to the client computing device which then becomes the registered client computing device.

4. The method of claim 3, further comprising sending identification data to be stored on the registered client computing device, the identification data to identify the registered client computing device.

5. The method of claim 4, wherein controlling access to the content comprises allowing a client computing device access to the content if the identification data matches that stored in a registration record.

6. The method of claim 3, further comprising in the case of the encrypted link being received from a client computing device other that the registered client system, then performing a modified registration operation to register the client computing device using another of the plurality of different encrypted links.

7. The method of claim 6, wherein the modified registration operation comprises sending a notification to the client computing device to indicate that the encrypted link has already been registered against the registered client computing device.

8. The method of claim 7, wherein the modified registration operation comprises prompting a user of the client computing device to indicate whether another of the plurality of different encrypted links to the content is required; and receiving a response to the prompting.

9. The method of claim 8, further comprising, if the response is affirmative, generating a new encrypted link to the content; and sending the new encrypted link to the user.

10. The method of claim 8, further comprising, receiving the new encrypted link from the client computing device and performing the primary registration operation.

11. The method of claim 6, wherein the modified registration operation comprises confirming whether the user of the client computing device is the authorized user.

12. The method of claim 11, further comprising, if the modified registration operation indicates that the user is not the authorized user, notifying an owner of the content that a new user wishes to view the content.

13. The method of claim 12, further comprising sending information about the new user to the owner.

14. The method of claim 13, further comprising generating and sending a new encrypted link to the content to an email address of the new user upon request of the owner.

15. A system, comprising:
a processor; and
a memory coupled to the processor, the memory storing instructions which when executed by the processor, cause the system to perform the method of claim 1.

16. The system of claim 15, wherein the memory further stores instructions which when executed by the processor, cause the system to perform a secondary registration operation to register the computing device when the computing device is determined not to be the first computing device to request access to the content through the encrypted link, the secondary registration operation comprising sending a fresh link to the unauthorized user who then becomes an authorized user, and performing a registration operation in respect of the fresh link when it is received from the authorized user the computing device is the first computing device to request access to the content through the fresh link.

17. A computer readable storage device, having stored thereon a sequence of instructions which when executed by a server system, cause the server system to perform the method of claim 1.

* * * * *